Feb. 23, 1932.  W. A. STROUD  1,846,405
DRINK MIXER
Filed March 28, 1930  2 Sheets-Sheet 1
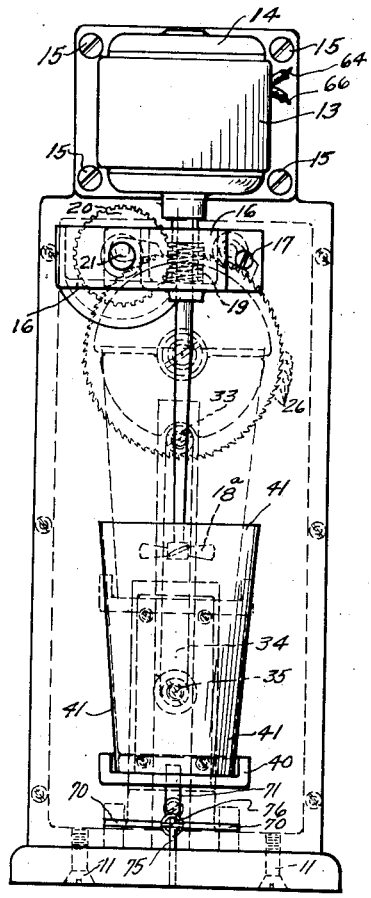
Fig. 1
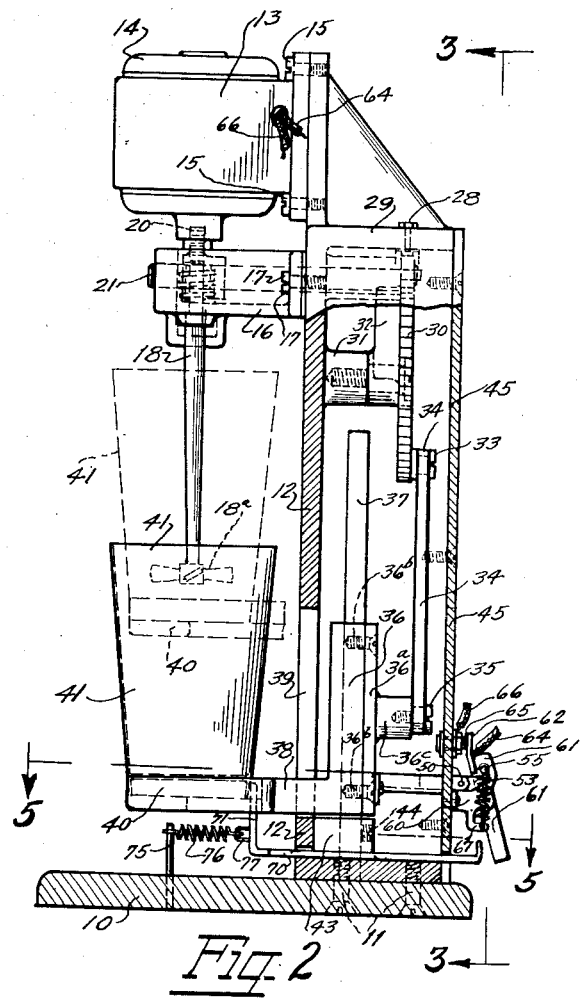
Fig. 2
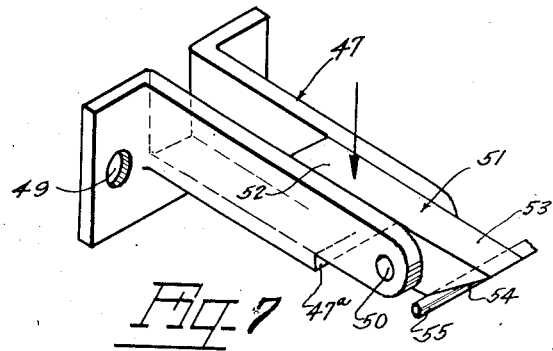
Fig. 7
WM. A. STROUD,
INVENTOR.
BY 
ATTORNEY.

Feb. 23, 1932.  W. A. STROUD  1,846,405

DRINK MIXER

Filed March 28, 1930   2 Sheets-Sheet 2

Wm. A. STROUD,
INVENTOR.

BY

ATTORNEY.

Patented Feb. 23, 1932

1,846,405

UNITED STATES PATENT OFFICE

WILLIAM A. STROUD, OF WILKESBORO, NORTH CAROLINA

DRINK MIXER

Application filed March 28, 1930. Serial No. 439,630.

This invention relates to a drink mixer and more especially to a drink mixer adapted for use of soda fountains and the like in which means are provided for automatically starting the agitator at the time the container holding the drink is placed in the machine together with means for automatically raising the container having the drink therein, while the mixing operation is going on, and also means for automatically lowering the container after it has reached a predetermined height and for automatically stopping the container when it has reached the starting point.

An object of my invention is to provide a drink mixer having means for automatically and forcibly raising the container, holding a drink while the same is being mixed and for forcing the container downward after raising the same, and for automatically stopping the container and the agitator when the container has reached the starting point.

Some of the objects of my invention having been stated other objects will appear as the description proceeds, when taken in connection with the accompanying drawings, in which—

Figure 1 is a front elevation of my device;

Figure 2 is a side elevation partly in cross-section taken along the line 2—2 in Figure 3;

Figure 7 is a perspective view of the switch operating means;

Figure 3:
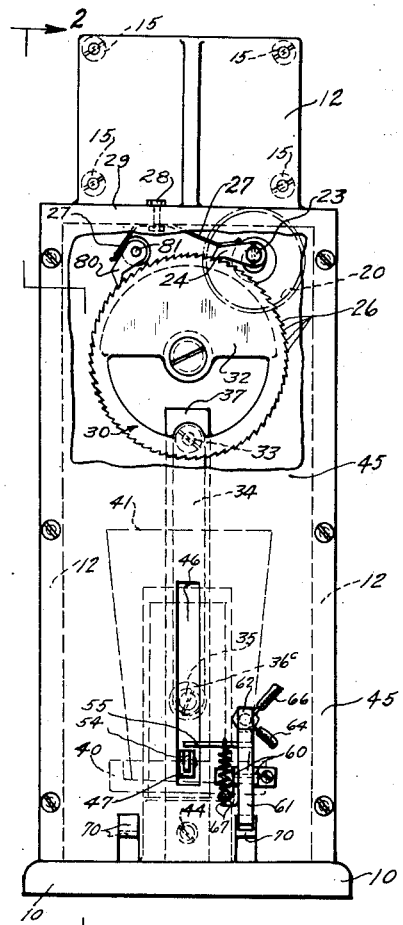
Figure 3 is a rear elevation of my device with parts thereof broken away.
Figure 5:
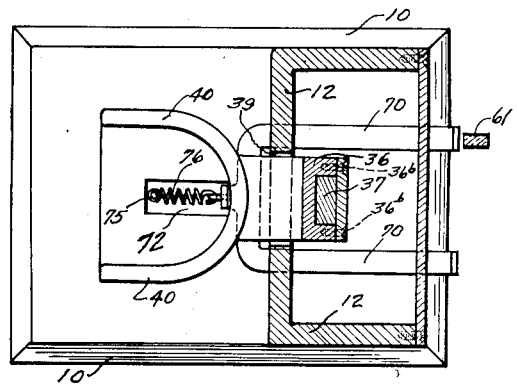
Figure 5 is a cross-sectional view taken along the line 5—5 in Figure 2.

Referring more specifically to the drawings the numeral 10 indicates the base portion of my device which has secured thereto by means of the screws 11 the L-shaped frame member 12, which projects upwardly and at the upper end thereof has secured thereto the support 13 for the motor 14 which is an electric motor, and this support 13 is secured to the member 12 by means of the screw 15. Just below the motor support there is secured another support 16 by means of screws 17, which member 16 is a casing and support for the agitator 18 which is rotatably mounted in the support 16, and this agitator has thereon a worm 19 which is adapted to mesh with a gear 20 which is fixedly mounted on the shaft 21, which shaft 21 projects through the member 12, this shaft 21 being rotatably mounted in the member 12, and has on the outer end thereof the crank arm portion 23 on which a dog 24 is pivotally mounted and being held in place by means of pin 25. This dog 24 is adapted to mesh with the teeth 26 and is adapted to mesh at all times with these teeth 26 by means of a leaf spring 27, which is secured as at 28 in the upper portion 29 of the casing for the working mechanism of my device. The teeth 26 are in the periphery of a wheel 30, which is rotatably mounted on a projection 31 projecting from the rear surface of the member 12. This wheel 30 has one side thereof designated by the reference character 32 heavier than the other side, and on the light side of this wheel as at 33 is turnably mounted the connecting rod 34 which projects downwardly and is loosely mounted as at 35 on the guide member 36, which is adapted to slide on the support 37 which is integral with the base member 12.

The guide member 36 has the outwardly projecting portion 38 which moves in a slot 39 of member 12, and this portion 38 has the rounded portion 40 which is adapted to receive a container 41 in which drinks are placed to be mixed. It might be stated that the agitator 18 has the stirring member 18a on the lower end thereof for the purpose of mixing the drink contained in the container 41. The member 36 is held on the member 37 by means of a plate 36a, which is secured to member 36 by means of screws 36b. The projection 36c is integral with the plate 36a to which the pin 35 is secured on which the connecting rod 34 is mounted. Also adjustably mounted on the slide 37 is a cuff 43 which is adjusted thereon by means of the set screw 44 for purposes of limiting the downward movement of the member 38. The rear end of the lower portion of the member 12 and the portion 27 at the top thereof has secured thereon the plate member 45 which encases the working mechanism, and in the rear of this plate 45 is a slot 46 through which the arm 47 or rather the pair of arms 47 project they being secured to the member 36a by means of suitable screws piercing the holes 49. This member 47 has pivotally mounted therein as at 50 the unbalanced weight member 51 which has the portion 52 heavier than the portion 53, and the portion 53 has the sloping surface 54 which is adapted to engage the pin 55 on the switch mechanism on its downward movement to throw the switch mechanism as will be presently described. This switch mechanism is mounted on the projection 60 and consist of the pivoted lever 61, which is of insulated material, and the upper end of this lever 61 has the contact point 62 thereon with the wire 63 being connected to said contact point, and this contact is adapted to at times engage with the contact point 65 to which wire 66 is connected, and when contact points 62 and 65 are in communication with each other a circuit is closed to operate the motor 14 and the agitator connected therewith together with the mechanism for supporting the container 41. This lug 60 has a downwardly projecting arm 67 to which is secured a tension spring 68, the upper end of this tension spring is secured as at 53 to the pin 55, the purpose of this arrangement is to hold the contact lever either in open or closed position.

Figure 4:
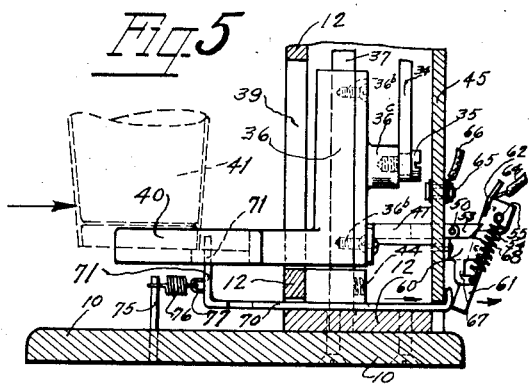
Figure 4 is a view of the lower portion of Figure 2 showing the parts in a different position.

In the bottom of member 12 a slot appears in which is slidably mounted a member 70 which is U-shaped, and has an upwardly projecting portion 71 which projects thru a slot 72 in the base 40 and is adapted to be engaged by the container 41 when the same is placed in the base 40 to push the parts to the position shown in Figure 2. A pin 75 is mounted in the base member 10 and has the tension spring 76 secured thereto and the other end of this tension spring is secured to member 77 on the portion 71, the purpose of this being to return the member 70 to the position shown in Figure 4 when the container and base moves upwardly, and it is evident that when the container and base return to lowered position that the projection 71 would project in the way of an ordinary glass placed in the base 40, but in drink mixing a metallic container is used and this container 41 has a bottom which is above the lower end of the side portions, so that the projection 71 will fit into this hollowed out bottom portion when the container returns to its starting point and therefore, the projection 71 will not interfere with the parts returning to the position from whence they started.

Figures 6, 8:
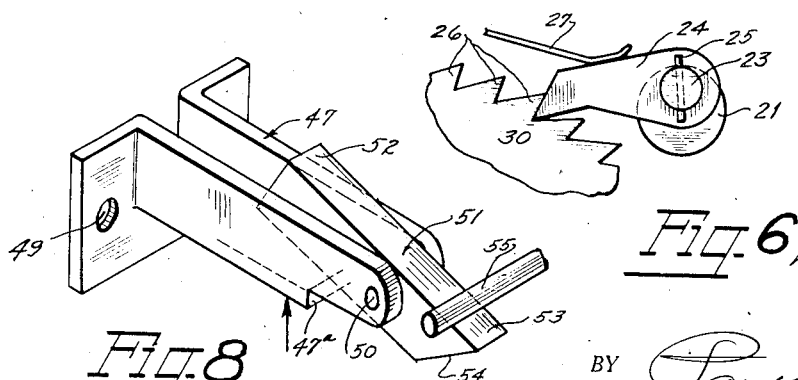
Figure 6 is an enlarged detail view of the dog and associated parts for operating my mechanism.
Figure 8 is a perspective view of the switch operating means showing the same in a position different from Figure 7.

The ratchet wheel 30 is held into the position into which it is forced by means of a dog 80 which is pivotally mounted as at 81 and this dog is held against the ratchet wheel by means of the other end of leaf spring 27 which has previously been described. It is therefore evident that when the container is placed in the base portion 40 that the parts will be placed in the position shown in Figure 2, and the switch member 61 will be tripped to form contact between wires 64 and 66, and as the point 63 moves upward it will engage the pin 65, but the stiffness of spring 68 will prevent tripping the switch, but the end 52 will be raised upwardly as shown in Figure 8 until the member 51 passes the pin 55. The machine will continue to run until it has reached its uppermost position, and then the container 41 will be lowered together with the member 51 and as it comes downward it will be occupying the position shown in Figure 7 and the lower portion of the member 47 being closed by the portion 47a will prevent movement of the member 51 in the other direction, and the sloping surface 54 will cause the pin 55 to be pushed outwardly to break the contact point between wires 64 and 66, and the parts will occupy the position shown in Figure 4, and the motor and agitator, and raising and lowering operation will automatically stop.

In the drawings and specification I have set forth a preferred embodiment of my invention, and although specific terms are employed, they are used in a generic and descriptive sense only, and not for purposes of limitation, the scope of the invention being set forth in the appended claims.

I claim:

1. In a drink mixer, an agitator, a drink container, means for forcibly raising the drink container with relation to the agitator, means for forcingly lowering the drink container with relation to the agitator, and means for automatically stopping the movement of the agitator and the drink container upon the finishing of the lowering operation.

2. In a drink mixer, an agitator, a base, a container adapted to fit on said base, means for driving the agitator, means for raising the base and the container thereon with relation to the agitator, means for lowering the base and the container thereon with relation to the agitator, and means for automatically stopping the agitator and the base upon the completion of the lowering operation.

3. In a drink mixer having an electrically driven agitator, a supporting member, means on said supporting member for supporting a container into which the drink is adapted to be placed, means for automatically starting the agitator upon the insertion of the container in said base, means for raising said base and the container with relation to said agitator and for lowering the base and the container with relation to said agitator and means for automatically stopping the agitator and the raising and lowering means upon completion of the raising and lowering operation.

4. In a drink mixer, an agitator, electric means for driving the agitator, a support, means on said support for receiving a container into which the drink is placed, means for raising said base and driving said agitator simultaneously and for lowering said base after raising the same, and means for automatically stopping the lowering operation upon completion of the said lowering operation.

5. A drink mixer having a vertically, slidable supporting member, means on said supporting member for receiving a container, an agitator adapted to project into the said container, means for driving the agitator, means for raising said supporting member and the container with relation to the agitator, and for lowering the same after raising the said support for a predetermined distance, means for automatically starting the raising operation upon the insertion of the container within the supporting base, and means for automatically stopping the lowering operation when the parts have reached their initial position.

6. A mixer comprising a standard, a motor housing having a motor journaled therein supported on the standard, a rotating agitating arm on the motor, a container bracket mounted movably on the standard, a connecting rod having a lower portion thereof connected with the bracket, and means connected with the upper end of the connecting rod and operatively associated with the motor for oscillating the bracket simultaneously with the rotation of the agitator.

7. A mixer comprising a standard, a motor housing having a motor journaled therein supported on the standard, a rotating agitating arm on the motor, a container bracket mounted movably on the standard, a connecting rod having a lower portion thereof connected with the bracket, means connected with the upper end of the connecting rod and operatively associated with the motor for oscillating the bracket simultaneously with the rotation of the agitator, and a base connected with the lower ends of the standard and projecting laterally from the standard.

8. A mixer comprising a standard, a motor housing having a motor journaled therein, supported on the standard, a rotating agitating arm on the motor, a container bracket mounted movably on the standard, a connecting rod having a lower portion thereof connected with the bracket, means connected with the upper end of the connecting rod and operatively associated with the motor for oscillating the bracket simultaneously with the rotation of the agitator, a base connected with the lower ends of the standard and projecting laterally from the standard, and said agitating arm rotating on a vertical axis and said container bracket oscillating in a vertical plane.

9. A mixer comprising a standard, a motor housing having a motor journaled therein, supported on the standard, a rotating agitating arm on the motor, a container bracket mounted movably on the standard, a connecting rod having a lower portion thereof connected with the bracket, means connected with the upper end of the connecting rod and operatively associated with the motor for oscillating the bracket simultaneously with the rotation of the agitator, a base connected with the lower ends of the standard and projecting laterally from the standard, said agitating arm rotating on a vertical axis and said container bracket oscillating in a vertical plane, and said standard being hollow.

In testimony whereof I affix my signature.

WILLIAM A. STROUD.